Patented Sept. 11, 1934

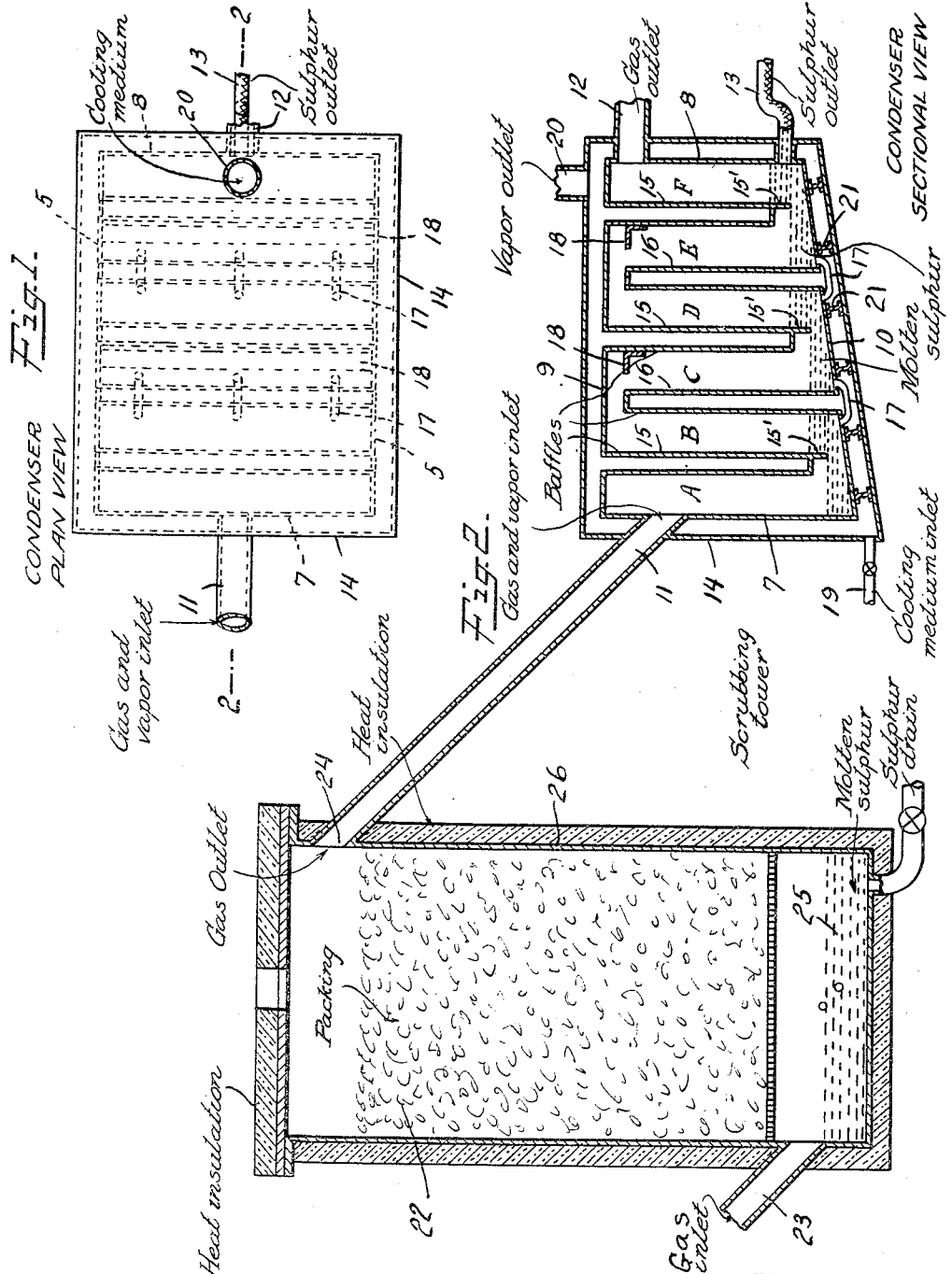

1,972,884

UNITED STATES PATENT OFFICE 1,972,884

RECOVERY OF SULPHUR

George H. Gleason, Montclair, N. J., and Alfred C. Loonam, Brooklyn, N. Y., assignors to Guggenheim Brothers, New York, N. Y., a copartnership Application March 31, 1932, Serial No. 602,237

8 Claims. (Cl. 23—225)

This invention relates to the condensation and recovery of sulphur vapor from a gaseous product containing the same, and has for its object the provision of an improved method of and apparatus for condensing sulphur vapor.

It has long been known that sulphur can be obtained from gases containing sulphur dioxide by treatment at an elevated temperature with a carbonaceous reducing agent, essentially in accordance with the following reactions:

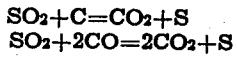

$$SO_2 + C = CO_2 + S$$
$$SO_2 + 2CO = 2CO_2 + S$$

However, no entirely satisfactory or successful commercial process utilizing these reactions has heretofore been developed, partly because of the difficulty of recovering the sulphur in a form which can be handled easily and cheaply. Most of the processes heretofore proposed either do not specifically state how the sulphur is to be recovered or assume its collection in a finely divided form, a procedure which not only presents all of the difficulty and expense of separating finely divided solids from gases but yields a product which is not easily handled.

The most convenient form in which to recover sulphur is as a liquid. This has presented certain difficulties, however, for the following reasons:

1. Sulphur vapor at temperatures below its normal boiling point polymerizes to $S_6$ and $S_8$, thereby greatly lowering its partial pressure even in a comparatively rich gas.

2. Liquid sulphur, in the temperature range between 160° and 225° C., is extremely viscous, so much so, in fact, that at 190° C. a vessel containing it can be inverted without the sulphur running out. While it is fluid above this temperature range, its vapor pressure is comparatively high and it is spontaneously inflammable.

3. The very low thermal conductivity of sulphur itself.

The most favorable temperatures for condensing sulphur are, therefore, in the lower fluid temperature range of 114-150° C. To secure collection of the condensed sulphur in this temperature range, the sulphur vapor (or gases containing sulphur vapor) must be cooled rapidly to below 150° C., and the resulting cooled vapor or droplets of sulphur appropriately collected. The former condition may be obtained by providing suitable arrangements and conditions for efficient heat transfer and the latter by bringing the gases in contact with a powerful solvent for sulphur.

In accordance with our present invention, the first condition is attained by bringing the gases into contact with efficiently cooled surfaces of large area, thereby rapidly cooling the gases below the viscous temperature range of liquid sulphur. The second condition is attained by bubbling the resulting sulphur vapor-bearing gases through liquid sulphur maintained at a temperature in the lower fluid range.

We have found that the practical attainment of these conditions is conveniently accomplished by surrounding the condensing chamber with a liquid having a boiling point within the lower fluid sulphur temperature range, thereby securing rapid dissipation of heat on one side of the chamber walls. Monochlorobenzene (the boiling point of which is about 132° C.), or water under a pressure of 10 to 30 pounds per square inch are appropriate liquids for the purpose.

We have found it desirable to construct the sulphur condenser so that the gases bubble through liquid sulphur one or more times, thereby insuring intimate contact between gas and liquid and preventing the formation of an insulating gas film on the surface of the liquid. The depth of liquid through which the gas passes need not be very great, 4½ inches being ample, and several passes through shallow layers are to be preferred to one pass through a greater depth. Following this procedure, we have found it practicable to collect over 94% of the sulphur content of a gas mixture containing only 6.5% sulphur by volume (as $S_8$).

The accompanying drawing illustrates, somewhat diagrammatically, a sulphur condenser embodying the principles of our invention. In this drawing, Fig. 1 is a top plan view, and
Fig. 2 is a sectional elevation on the section line 2—2 of Fig. 1.

The condenser is made of good heat conducting material, such, for example, as sheet steel. The condensing chamber is formed of vertical side walls 5, vertical end walls 7 and 8, a horizontal top 9 and an inclined bottom 10. The gas inlet 11 is through the end wall 7, where the inclined bottom 10 is lowest, and the gas outlet 12 and the molten sulphur outlet 13 are through the end wall 8, where the inclined bottom 10 is highest. The condensing chamber is surrounded by a casing 14, of sheet steel or the like, suitably spaced therefrom to provide an appropriate jacket for the heat dissipating medium.

Transverse and vertically disposed hollow partitions or baffles 15 depend from the top 9 of the condensing chamber to within a short distance of the inclined bottom 10. Between the baffles 15 are transverse and vertically disposed hollow baffles or partitions 16 extending from the inclined bottom 10 to within a short distance of the top 9. The hollow interiors of the baffles 15 and 16 communicate with the jacket formed between the condenser walls and the casing 14. It is our preferred practice to extend one wall of the hollow partitions 15 a short distance below the jacketed or hollow part of the partition to form a lower barrier 15'.

Pipes 17, or other appropriate channels, provide communication for molten sulphur from one side to the other of the partitions 16. One or more of the partitions 15, near the discharge end of the condensing chamber, are provided near their upper ends, on the gas entering side, with transverse baffles 18 to knock down any large globules of condensed sulphur entrained with the gases. The height of the discharge end of the molten sulphur outlet 13 is preferably adjustable in order to appropriately control the level of the molten sulphur on the bottom of the condenser. An inlet 19 is provided for the admission of the cooling or heat dissipating liquid medium to the jacketed portions of the condenser, and the top of the casing 14 has an opening 20 for the escape of vapor. The condensing chamber proper is supported on the bottom of the casing 14 by I-beams 21, or other appropriate form of support.

In operation, the gases containing sulphur vapor enter the condenser through the pipe 11 and flow downward into contact with the molten sulphur on the inclined bottom 10. The gases then pass under the first barrier 15' and bubble through the layer of molten sulphur in the bottom of the next chamber B. Flowing upwardly through the chamber B and downwardly through the chamber C, the gases again bubble through molten sulphur at the bottom of the chamber D. And again the gases bubble through molten sulphur in passing from the chamber E to the chamber F.

The molten sulphur is maintained at its proper levels in the various chambers by the gas pressure and by the positions of the barriers 15' and the height of the discharge end of the molten sulphur outlet pipe 13.

The cooling or heat dissipating medium, having a boiling point between 114°–150° C., fills the jacketed portions of the condenser. The vapor of this medium, formed in the course of the condensation of the sulphur, passes out through the outlet 20 and may be either condensed and returned or used for supplying heat or for any other suitable purpose.

As a preparatory step to the condensation of the sulphur vapor, it is our preferred practice to pass the gaseous product containing the sulphur vapor in contact with molten sulphur at a temperature between 450° C.–250° C., as described in our copending application Serial No. 602,238 filed March 31, 1932. Gaseous products containing sulphur vapor may also contain materials which, if allowed to pass to the condenser, would separate out with and contaminate the sulphur product. These contaminants vary with the source of the gaseous product and may be present in the solid, liquid or vapor state. For example, the gaseous product from the reduction of sulphur dioxide by hot carbonaceous material may contain volatile tarry matters and solid particles of reducing agent. The contemplated treatment of the gaseous product with molten sulphur, which is in the nature of a washing or scrubbing action, removes such contaminants. The treatment may be advantageously carried out in a tower 26 of suitable proportions, made of steel (suitably insulated) and filled with a packing 22, such as coke, Raschig rings, "Chemico" rings, or the like, to provide a large gas contact surface over which liquid sulphur flows. The gas inlet 23 is at the bottom and the gas outlet 24 at the top of the tower. The sulphur used for washing may be introduced at the top of the tower as a spray or in fine streams, or the incoming gases may be brought in contact with liquid sulphur in a reservoir (25) at the bottom of the tower at a temperature high enough to permit them to entrain an adequate amount of sulphur vapor, which vapor is allowed to condense and return to the reservoir by causing the temperature to decrease as the gases proceed upward toward the outlet. By the latter procedure, we cool the gases, obviate the necessity for a circulating pump, bring comparatively clean sulphur into contact with the gases, and secure the benefits of the fact that even fine particles or droplets in suspension act as condensation centers and may be so laden with liquid sulphur that they settle out.

While it is desirable that the exit gases be at such a temperature that they contain the same amount of sulphur as the incoming gases thereby maintaining a constant amount of sulphur in the washer, actual conditions of operation may make this impracticable. In such cases, the amount of liquid sulphur in the washer will change and it will be necessary to add or bleed off sulphur from time to time.

The incoming gases may be bubbled through the liquid sulphur to insure intimate contact. If the incoming gases do not contain enough heat, it may be necessary to supply external heat principally at the bottom to secure circulation of sulphur. Part of the circulating sulphur is drawn off from time to time as the amount and nature of the collected contaminants may warrant and is replaced by clean sulphur. In actual practice, we have found that very satisfactory purification is obtained with an incoming temperature of the gases such that the temperature of the reservoir of liquid sulphur at the bottom of the washer is from 350° C. to 450° C., and the washer is so designed and operated that the gases exit at its top at a temperature approximately 100° C. lower.

The following example illustrates the efficiency of the washing operation: A collection of sulphur from the gaseous product of a furnace, in which sulphur dioxide was reduced by coke, yielded a product which, although containing 98.8% S, was dark-colored and hence of inferior marketability. The inclusion of the washer in the same installation resulted in raising the sulphur content of the product to better than 99.5%, and the color of the product was substantially identical with that of present day commercial grades of sulphur or brimstone.

From the top of the washer the gases are conducted to the sulphur condenser.

It will be seen from the foregoing description that the condensation of sulphur vapor (or of sulphur in the form of mist or droplets) in accordance with our invention is characterized by rapidly cooling the gas containing the sulphur vapor to a temperature below 150° C., and bringing the gas in contact with liquid sulphur at a temperature such that the condensing sulphur vapor coalesces to a collectible form of liquid sulphur of low viscosity.

The sulphur condenser of the invention is adapted for the condensation of sulphur vapor contained in a wide range of concentrations in gaseous products from various operations, such, for example, as from the reduction of sulphur dioxide by hot carbonaceous material, either directly or incidentally in pyritic roasting or smelting operations in closed top furnaces, from the distillation of pyrite or purification residues from gas works, etc. In actual practice, we have used the condenser with distinct success in the complete process of recovering elemental sulphur from gases containing sulphur dioxide, as described in our copending application, Serial No. 602,236, filed March 31, 1932.

We claim:

1. In the recovery of sulphur from a gaseous product containing sulphur vapor, the step of condensing the sulphur vapor which comprises rapidly cooling the gaseous product through the temperature range in which molten sulphur is viscous to a temperature below 150° C., and passing the resulting cooled gaseous product through one or more bodies of molten sulphur.

2. In the recovery of sulphur from a gaseous product containing sulphur vapor, the step of condensing the sulphur vapor which comprises passing the gaseous product in contact with artificially cooled surfaces of considerable area and thereby rapidly cooling the gaseous product through the temperature range in which molten sulphur is viscous to a temperature below 150° C., and passing the resulting cooled gaseous product through one or more bodies of molten sulphur.

3. In the recovery of sulphur from a gaseous product containing sulphur vapor, the step of condensing the sulphur vapor which comprises passing the gaseous product in a tortuous path in contact with artificially cooled surfaces of considerable area and through one or more bodies of molten sulphur, whereby the gaseous product is rapidly cooled to a temperature below 150° C. and condensed droplets of sulphur are collected in said body or bodies of molten sulphur.

4. In the recovery of sulphur from a gaseous product containing sulphur vapor, the step of condensing the sulphur vapor which comprises passing the gaseous product in contact with surfaces of considerable area, artificially cooling said surfaces by an appropriately confined liquid having a boiling point between 115°–150° C., and passing the gaseous product during its contact with said surfaces through one or more bodies of molten sulphur.

5. In the recovery of sulphur from a gaseous product containing sulphur vapor, the step of condensing the sulphur vapor which comprises passing the gaseous product in contact with surfaces of considerable area, artificially cooling said surfaces by water appropriately confined under a pressure of about 10 to 30 pounds per square inch, and passing the gaseous product during its contact with said surfaces through one or more bodies of molten sulphur.

6. In the recovery of sulphur from a gaseous product containing sulphur vapor, removing deleterious contaminants from the gaseous product preparatory to the condensation of the sulphur vapor by passing the gaseous product in contact with molten sulphur at a temperature between about 450° C. and about 250° C., then rapidly cooling the gaseous product through the temperature range in which molten sulphur is viscous to a temperature below 150° C., and passing the resulting cooled gaseous product through one or more bodies of molten sulphur.

7. In the recovery of sulphur from a gaseous product containing sulphur vapor, removing deleterious contaminants from the gaseous product preparatory to the condensation of the sulphur vapor by passing the gaseous product in contact with molten sulphur at an initial temperature of about 350–450° C. and an exit temperature of about 100° below the initial temperature, then passing the gaseous product in contact with artificially cooled surfaces of considerable area and thereby rapidly cooling the gaseous product through the temperature range in which molten sulphur is viscous to a temperature below 150° C., and passing the resulting cooled gaseous product through one or more bodies of molten sulphur.

8. In the recovery of sulphur from a gaseous product containing sulphur vapor, removing deleterious contaminants from the gaseous product preparatory to the condensation of the sulphur vapor by passing the gaseous product at a temperature above that at which molten sulphur is viscous over or through a reservoir of molten sulphur and up through a tower of appropriate packing material which the gaseous product comes in contact with descending molten sulphur, and then passing the gaseous product in a tortuous path in contact with artificially cooled surfaces of considerable area and through one or more bodies of molten sulphur whereby the gaseous product is rapidly cooled to a temperature below 150° C. and condensed droplets of sulphur are collected in said body or bodies of molten sulphur.

GEORGE H. GLEASON.
ALFRED C. LOONAM.